US012693933B2

(12) United States Patent
Liang et al.

(10) Patent No.: US 12,693,933 B2
(45) Date of Patent: Jul. 28, 2026

(54) MEMORY CONTROL METHOD AND MEMORY STORAGE DEVICE

(71) Applicant: Hefei Core Storage Electronic Limited, Anhui (CN)

(72) Inventors: Yuecong Liang, Shandong (CN); Yan Zheng, Anhui (CN); Kai-Di Zhu, Anhui (CN); Zhi Wang, Anhui (CN); Tsung-Lin Wu, Hsinchu City (TW); Qi-Ao Zhu, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 51 days.

(21) Appl. No.: 18/810,544

(22) Filed: Aug. 21, 2024

(65) Prior Publication Data

US 2025/0245101 A1      Jul. 31, 2025

(30) Foreign Application Priority Data

Jan. 25, 2024     (CN) .......................... 202410101912.1

(51) Int. Cl.
*G06F 11/10*          (2006.01)
*G06F 11/07*          (2006.01)
(52) U.S. Cl.
CPC .......... *G06F 11/108* (2013.01); *G06F 11/076* (2013.01); *G06F 11/1048* (2013.01)
(58) Field of Classification Search
CPC .. G06F 11/108; G06F 11/076; G06F 11/1048; G06F 11/1076; G06F 13/1668; Y02D 10/00
See application file for complete search history.

(56) References Cited

U.S. PATENT DOCUMENTS

2012/0233518 A1*   9/2012   Lee ................... H03M 13/2933
                                                                        714/755
2016/0034348 A1*   2/2016   Park ................... G06F 11/1048
                                                                        714/764

(Continued)

FOREIGN PATENT DOCUMENTS

CN          104217762          12/2014
CN          105468292          4/2016

(Continued)

OTHER PUBLICATIONS

"Office Action of Taiwan Counterpart Application", issued on Jul. 30, 2025, p. 1-p. 8.

*Primary Examiner* — Thien Nguyen
(74) *Attorney, Agent, or Firm* — JCIPRNET

(57)          ABSTRACT

A memory control method and a memory storage device, and the method includes: dividing each of the storage groups into a first or second storage group; receiving a first write command from a host system, in which the first write command includes first data and a first address; performing a first encoding process on the first data to obtain first parity data; storing the first data and the first parity data in a first physical programming cell indicated by the first address; determining whether a current storage group to which the first physical programming cell belongs is the first or second storage group; and in response to the current storage group being the first storage group, performing a second encoding process on the first physical programming cell to obtain second parity data of the first physical programming cell, and storing the second parity data of the first physical programming cell.

18 Claims, 7 Drawing Sheets

(56)     References Cited

U.S. PATENT DOCUMENTS

| | | | |
|---|---|---|---|
| 2019/0012109 A1 | 1/2019 | Byun | |
| 2019/0196963 A1 | 6/2019 | Byun | |
| 2019/0198115 A1 | 6/2019 | Lin et al. | |
| 2019/0370112 A1* | 12/2019 | Pangal | G06F 11/1076 |
| 2020/0272540 A1 | 8/2020 | Sun et al. | |
| 2022/0180905 A1* | 6/2022 | Islam | G11C 13/004 |
| 2022/0254433 A1 | 8/2022 | Park et al. | |
| 2025/0045158 A1* | 2/2025 | Chen | G06F 12/0284 |

FOREIGN PATENT DOCUMENTS

| | | |
|---|---|---|
| CN | 107092536 | 8/2017 |
| CN | 108958640 | 12/2018 |
| CN | 109542671 | 3/2019 |
| CN | 112051963 | 12/2020 |
| CN | 114822664 | 7/2022 |
| JP | H0896310 | 4/1996 |
| TW | 201926059 | 7/2019 |

* cited by examiner

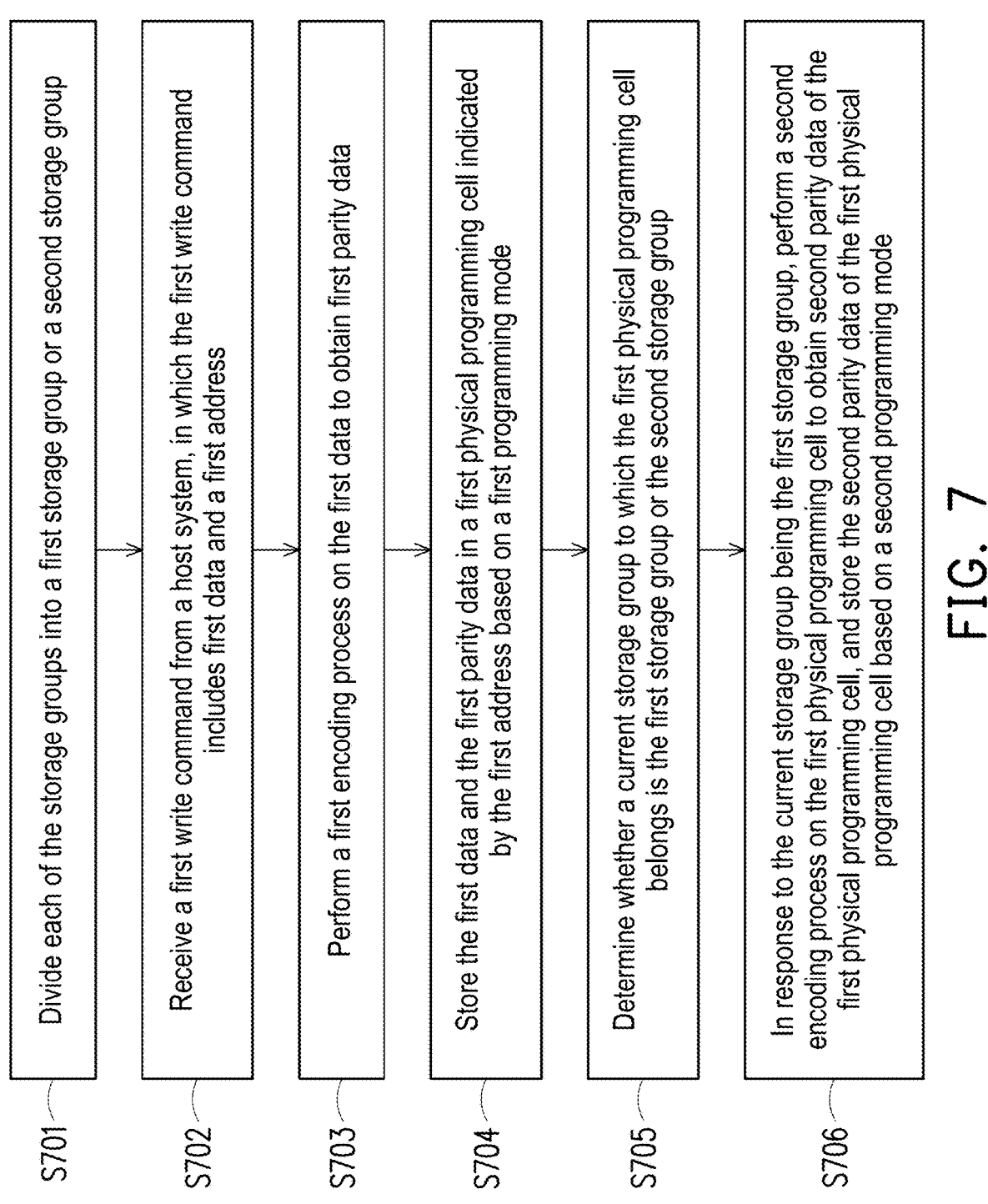

S701 — Divide each of the storage groups into a first storage group or a second storage group S702 — Receive a first write command from a host system, in which the first write command includes first data and a first address S703 — Perform a first encoding process on the first data to obtain first parity data S704 — Store the first data and the first parity data in a first physical programming cell indicated by the first address based on a first programming mode S705 — Determine whether a current storage group to which the first physical programming cell belongs is the first storage group or the second storage group S706 — In response to the current storage group being the first storage group, perform a second encoding process on the first physical programming cell to obtain second parity data of the first physical programming cell, and store the second parity data of the first physical programming cell based on a second programming mode

FIG. 7

MEMORY CONTROL METHOD AND MEMORY STORAGE DEVICE

CROSS-REFERENCE TO RELATED APPLICATION

This application claims the priority benefit of China application serial no. 202410101912.1, filed on Jan. 25, 2024. The entirety of the above-mentioned patent application is hereby incorporated by reference herein and made a part of this specification.

BACKGROUND

Technical Field

The disclosure relates to a memory control technology, and more particularly to a memory control method and a memory storage device.

Description of Related Art

Nowadays, many hard disk or memory storage technologies introduce redundant array of independent disks (RAID) storage configuration to improve data protection capabilities. In an RAID configuration, when reading user data, errors in the user data may be corrected through parity data. However, when reading data, in the case where uncorrectable error correcting code (UECC) occurs in multiple physical programming cells (e.g., physical pages), it is difficult to recover the erroneous data by adjusting the read voltage and parity data, thereby affecting the operation of the memory device.

SUMMARY

The disclosure provides a memory control method and a memory storage device, which may improve the protection capability of user data to enhance the reliability of user data.

The embodiment of the disclosure provides a memory control method used in a memory module. The memory module includes multiple storage groups. Each of the multiple storage groups includes multiple wordlines. Each of the multiple wordlines includes at least one physical programming cell. The memory control method includes: dividing each of the storage groups into a first storage group or a second storage group; receiving a first write command from a host system, in which the first write command includes first data and a first address; performing a first encoding process on the first data to obtain first parity data; storing the first data and the first parity data in a first physical programming cell indicated by the first address based on a first programming mode; determining whether a current storage group to which the first physical programming cell belongs is the first storage group or the second storage group; and in response to the current storage group being the first storage group, performing a second encoding process on the first physical programming cell to obtain second parity data of the first physical programming cell, and storing the second parity data of the first physical programming cell based on a second programming mode.

The embodiment of the disclosure also provides a memory storage device including a connection interface, a memory module, and a memory controller. The connection interface is configured to connect to a host system. The memory module includes multiple storage groups. Each of the multiple storage groups includes multiple wordlines.

Each of the multiple wordlines includes at least one physical programming cell. The memory controller connects the connection interface and the memory module. The memory controller is configured to divide each of the storage groups into a first storage group or a second storage group. The memory controller is further configured to receive a first write command from the host system. The first write command includes first data and a first address. The memory controller is further configured to perform a first encoding process on the first data to obtain first parity data. The memory controller is further configured to store the first data and the first parity data in a first physical programming cell indicated by the first address based on a first programming mode. The memory controller is further configured to determine whether a current storage group to which the first physical programming cell belongs is the first storage group or the second storage group. In response to the current storage group being the first storage group, the memory controller is further configured to perform a second encoding process on the first physical programming cell to obtain second parity data of the first physical programming cell, and storing the second parity data of the first physical programming cell based on a second programming mode.

Based on the above, the disclosure provides a memory control method and a memory storage device, which may perform a second encoding process with higher reliability on a weak string (first storage group) to enhance the protection capability of user data and increase the error correction capability.

In order to make the aforementioned features and advantages of the disclosure comprehensible, embodiments accompanied with drawings are described in detail below.

BRIEF DESCRIPTION OF THE DRAWINGS

FIG. 7 is a flow chart of the memory control method according to one embodiment of the disclosure.

DESCRIPTION OF THE EMBODIMENTS

Figure 1:
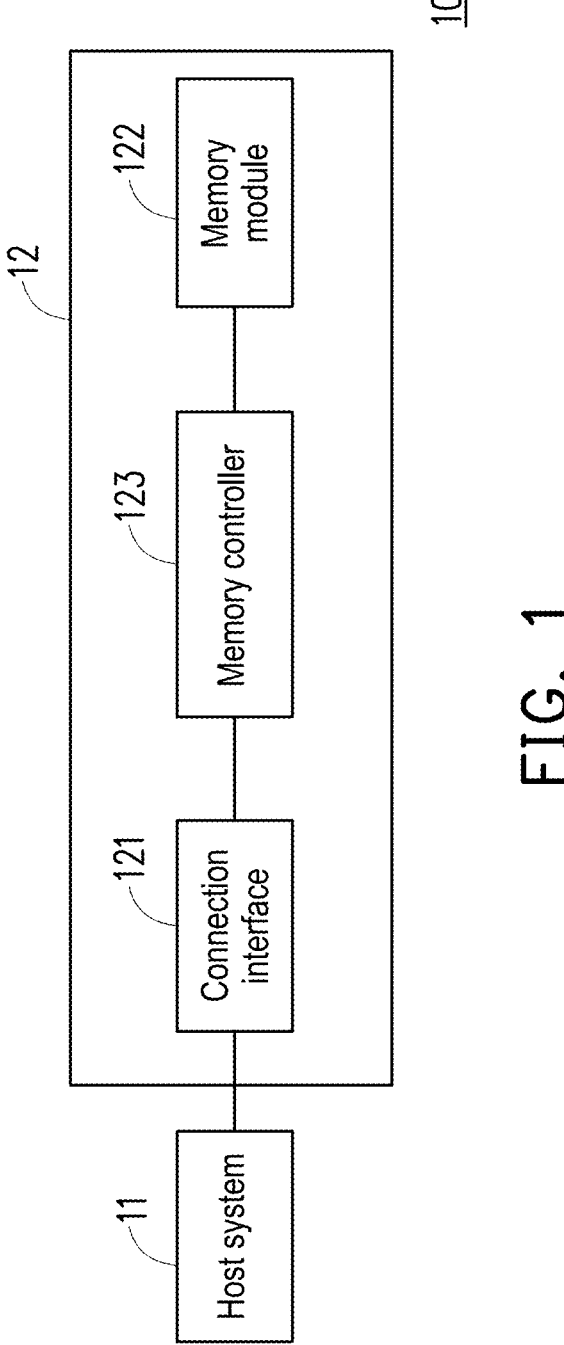
FIG. 1 is a schematic view of the memory storage device according to one embodiment of the disclosure.

Reference will now be made in detail to the exemplary embodiments of the disclosure, and examples of the exemplary embodiments are illustrated in the accompanying drawings. Whenever possible, the same reference numerals are used in the drawings and the description to indicate the same or similar parts.

FIG. 1 is a schematic view of the memory storage device according to one embodiment of the disclosure. Referring to FIG. 1, a memory storage system 10 includes a host system 11 and a memory storage device 12. The host system 11 may be any type of computer system. For example, the host system 11 may be a notebook computer, a desktop computer, a smart phone, a tablet computer, an industrial computer, etc. The memory storage device 12 is configured to store data from the host system 11. For example, the memory storage device 12 may include a solid-state drive, a USB flash drive, or other types of non-volatile storage devices. The host system 11 may be electrically connected to the memory storage device 12 via a serial advanced technology attachment (SATA) interface, a peripheral component interconnect express (PCI Express), a universal serial bus (USB), or other types of connection interfaces. Thus, the host system 11 may store data to the memory storage device 12 and/or read data from the memory storage device 12.

The memory storage device 12 may include a connection interface 121, a memory module 122, and a memory controller 123. The connection interface 121 is configured to connect the memory storage device 12 to the host system 11. For example, the connection interface 121 may support connection interface standards such as SATA, PCI Express, or USB. The memory storage device 12 may communicate with the host system 11 via the connection interface 121.

The memory module 122 is configured to store data. The memory module 122 may include a rewritable non-volatile memory module. The memory module 122 includes a memory cell array. The memory cells in the memory module 122 store data in the form of voltage. For example, the memory module 122 may include a single level cell (SLC) NAND flash memory module, a multi level cell (MLC) NAND flash memory module, a triple level cell (TLC) NAND flash memory module, a quad level cell (QLC) NAND flash memory module, or other memory modules with similar characteristics.

The memory controller 123 is connected to the connection interface 121 and the memory module 122. The memory controller 123 may be configured to control the memory storage device 12. For example, the memory controller 123 may control the connection interface 121 and the memory module 122 to perform data access and data management. The memory controller 123 may be, for example, a central processing unit (CPU), a graphics processing unit (GPU), or other programmable general-purpose or special-purpose microprocessors, a digital signal processor (DSP), a programmable controller, an application specific integrated circuit (ASIC), a programmable logic device (PLD), or other similar devices or combinations of the above devices.

In one embodiment, the memory controller 123 is also referred to as a flash memory controller. In one embodiment, the memory module 122 is also referred to as a flash memory module. The memory module 122 may receive a command sequence from the memory controller 123 and access data stored in the memory cell according to this command sequence.

Figure 2:
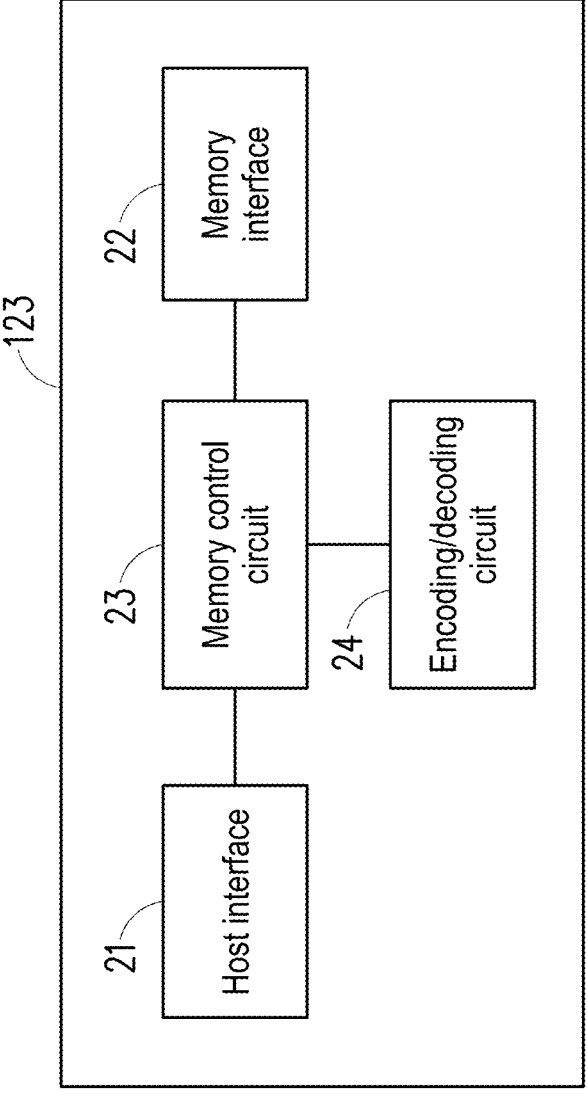
FIG. 2 is a schematic view of the memory controller according to one embodiment of the disclosure.

FIG. 2 is a schematic view of the memory controller according to one embodiment of the disclosure. Referring to FIG. 1 and FIG. 2, the memory controller 123 includes a host interface 21, a memory interface 22, a memory control circuit 23, and an encoding/decoding circuit 24. The host interface 21 is configured to be coupled to the host system 11 via the connection interface 121 to communicate with the host system 11. The memory interface 22 is configured to connect to the memory module 122 to communicate with the memory module 122.

The memory control circuit 23 is connected to the host interface 21, the memory interface 22, and the encoding/decoding circuit 24. The memory control circuit 23 may be configured to control the host interface 21, the memory interface 22, and the encoding/decoding circuit 24. For example, the memory control circuit 23 may communicate with the host system 11 via the host interface 21 and access the memory module 122 via the memory interface 22. The memory control circuit 23 may also be regarded as the control core of the memory controller 123. In the following embodiments, the description of the memory control circuit 23 is equivalent to the description of the memory controller 123.

The encoding/decoding circuit 24 is configured to encode and decode data. For example, data from the host system 11 (i.e., user data) may be encoded by the encoding/decoding circuit 24 before being stored in the memory module 122. When data is read from the memory module 122, the data may be decoded by the encoding/decoding circuit 24 to correct errors in the data before being transmitted to the host system 11. For example, the encoding/decoding circuit 24 may use at least one of encoding algorithms such as low density parity code (LDPC), BCH code, convolutional code, turbo code, or Reed-Solomon codes (RS codes) to perform encoding and decoding.

Figure 3:
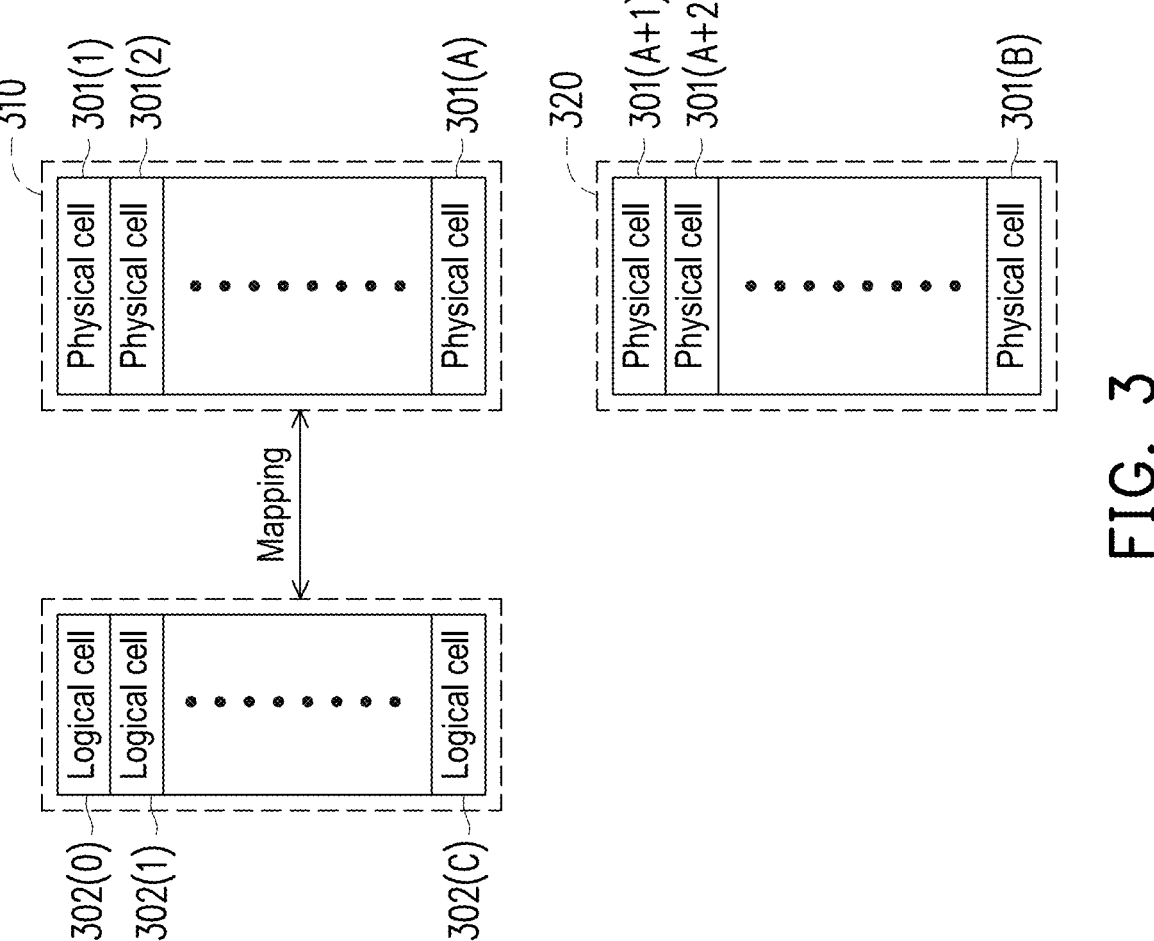
FIG. 3 is a schematic view of the management memory module according to one embodiment of the disclosure.

FIG. 3 is a schematic view of the management memory module according to the embodiment of the disclosure. Referring to FIG. 1 to FIG. 3, the memory module 122 includes multiple physical cells 301(1) to 301(B). Each of the physical cells includes multiple memory cells and is configured to store data in a non-volatile manner. For example, one physical cell may include one or more physical erasing cells (e.g., physical blocks). Each of the physical cells may include multiple physical programming cells (e.g., physical pages). Multiple memory cells in one physical page may be programmed simultaneously to store data. All memory cells in one physical cell (or physical block) may be erased simultaneously.

In one embodiment, the physical cells 301(1) to 301(A) and 301(A+1) to 301(B) in the memory module 122 may be divided into a storage area 310 and a spare area 320, respectively. The physical cells 301(1) to 301(A) in the storage area 310 store data from the host system 11 (also referred to as user data). The physical cells 301(A+1) to 301(B) in the spare area 320 do not store data.

In one embodiment, when new data from the host system 11 needs to be stored, one or more physical cells in the spare area 320 are selected and used to store the new data. The physical cells in the spare area 320 used to store data may be divided into the storage area 310. As more and more physical cells in the spare area 320 are used to store data, the total number of physical cells in the spare area 320 gradually decreases.

In one embodiment, the memory control circuit 23 may configure multiple logical cells 302(1) to 302(C) to map physical cells in the storage area 310. For example, a logical cell may include one or more logical addresses. For example, a logical address may include one or more logical block addresses (LBAs). The mapping relationship between the logical cells and the physical cells may be recorded in a logical-to-physical mapping table. When receiving an access command from the host system 11, the memory control circuit 23 may access the physical cells in the storage area 310 and/or the spare area 320 according to this logical-to-physical mapping table.

In one embodiment, in the case where a physical cell is currently mapped by a logical cell, it means that valid data is stored in this physical cell. However, in the case where a certain physical cell is not currently mapped by any logical cell, it means that no valid data is stored in this physical cell.

Figure 4:
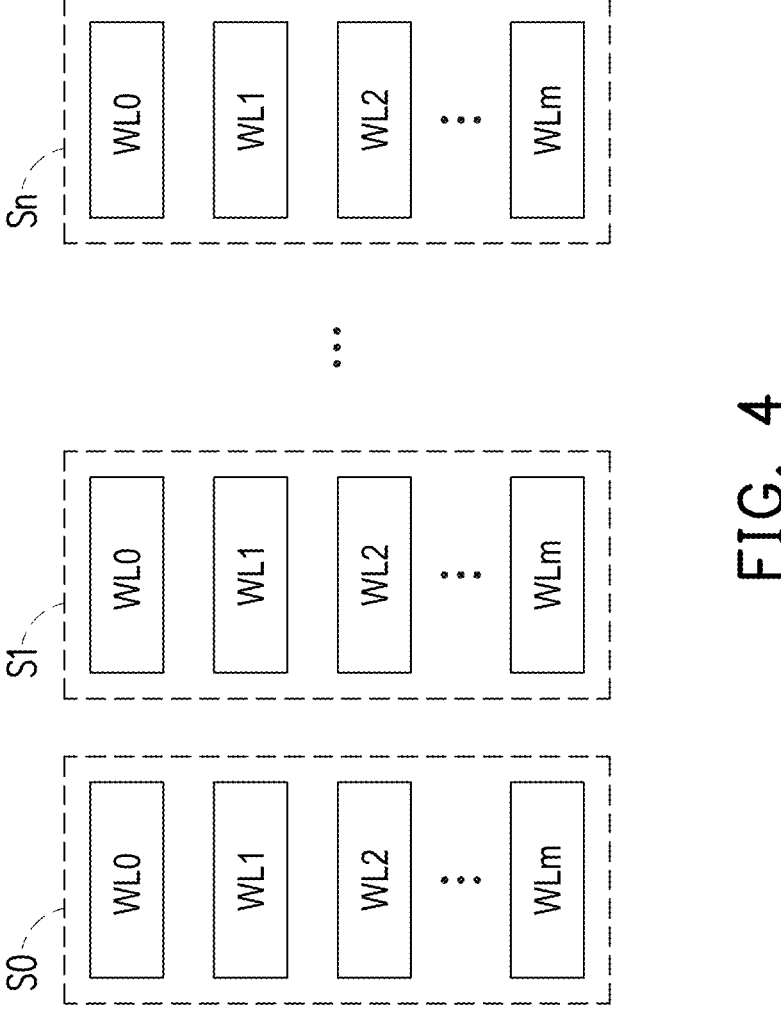
FIG. 4 is a schematic view of the management memory module according to one embodiment of the disclosure.

FIG. 4 is a schematic view of the management memory module according to one embodiment of the disclosure. Referring to FIG. 1 to FIG. 4, the memory module 122 includes storage groups S0 to Sn. Each of the storage groups includes multiple wordlines WL0 to WLm. Each of the storage groups includes multiple physical programming cells. Specifically, each of the storage groups is, for example, a string. Each of the wordlines may include one or more physical programming cells. For example, in the case where one memory cell is capable of storing more than 2 bits, the physical programming cells of the same wordline may be classified into at least a lower physical programming cell and an upper physical programming cell. In one embodiment, the physical programming cells (e.g., physical pages) on multiple wordlines WL0 to WLm may be integrated into one storage group.

Generally, the memory control circuit 23 performs a redundant array of independent disks (RAID) encoding operation in the following manner: performing an exclusive or (XOR) operation on the data on one string to generate parity data. However, when reading data, in the case where UECC errors occur in multiple wordlines, it is difficult to recover the erroneous data through parity data. Specifically, there are some weak strings with poor quality in the memory module 122, and the above-mentioned UECC errors may occur on these strings, thereby affecting the operation status of the memory storage device 12.

To enhance the reliability of user data, the disclosure provides a memory control method that improves the protection of user data and increases the error correction capability by performing improvements on the above-mentioned RAID encoding operation. Specifically, the memory control method of the disclosure may improve the protection of user data by performing an encoding process with higher reliability on weak strings.

First, the memory control circuit 23 may divide the storage groups S0 to Sn into a first storage group or a second storage group. Specifically, the first storage group may be, for example, a weak string of poor quality, and the second storage group may be, for example, a normal string of average quality. The memory control circuit 23 may first obtain an average bit error ratio (BER) of multiple physical programming cells in each of the storage groups. In response to one average bit error ratio being greater than a default threshold value, the memory control circuit 23 may divide a storage group corresponding to this average bit error ratio (e.g., storage group S0) as the first storage group; on the contrary, in response to one average bit error ratio being less than or equal to a default threshold value, the memory control circuit 23 may divide a storage group corresponding to this average bit error ratio (e.g., storage group S1) as the second storage group.

Next, the memory control circuit 23 may receive a first write command from the host system 11. The first write command includes first data and a first address. The memory control circuit 23 may perform a first encoding process on the first data to obtain first parity data. Specifically, the memory control circuit 23 may control the encoding/decoding circuit 24 to perform a first encoding process on the first data.

In one embodiment, the first encoding process may be, for example, an error correcting encoding process, and the first parity data is an error correcting code (ECC). The memory control circuit 23 may store the first data and the first parity data in a first physical programming cell indicated by the first address based on a first programming mode. In detail, the first programming mode is a multi level cell (MLC) programming mode or a triple level cell (TLC) programming mode. That is, the memory control circuit 23 may store the first data and the first parity data in a physical erasing cell to which the first physical programming cell belongs, and this physical erasing cell is an MLC physical erasing cell or a TLC physical erasing cell.

Figure 5:
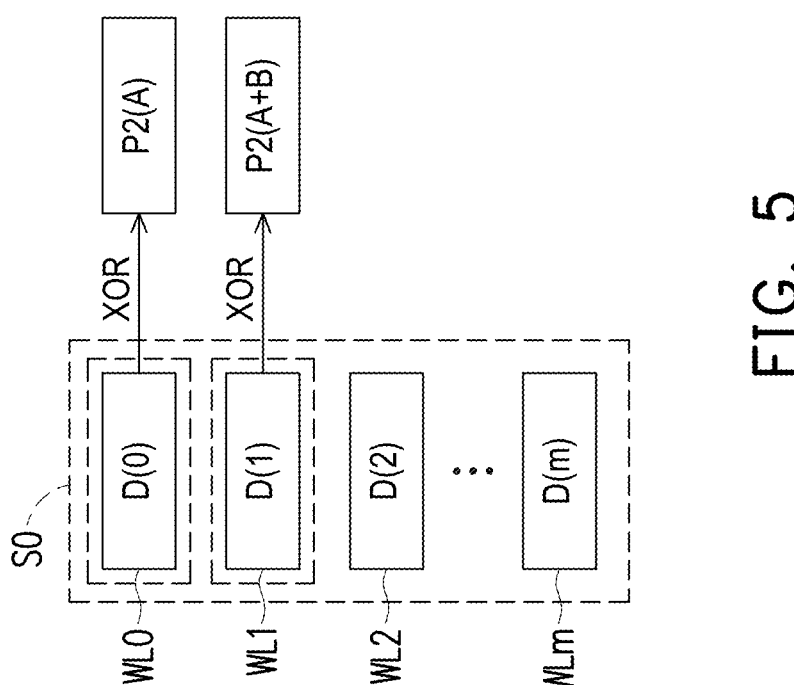
FIG. 5 is a schematic view of the second encoding process according to one embodiment of the disclosure.

In addition, the memory control circuit 23 may determine whether a current storage group to which the first physical programming cell belongs is the first storage group or the second storage group. In response to the current storage group (e.g., storage group S0) being the first storage group (i.e., weak string), the memory control circuit 23 may control the encoding/decoding circuit 24 to perform a second encoding process to obtain second parity data. As shown in FIG. 5, FIG. 5 is a schematic view of the second encoding process according to one embodiment of the disclosure. Below refers to FIG. 1 to FIG. 5. In one embodiment, in response to the first physical programming cell belonging to the first wordline WL0 of the current storage group (storage group S0), the memory control circuit 23 may perform an exclusive or (XOR) operation on data D(0) (including the first data) in the first physical programming cell to obtain the second parity data P2(A) of the first physical programming cell; on the contrary, in response to the first physical programming cell not belonging to the first wordline WL0 of the current storage group S0, for example, WL1, an exclusive or (XOR) operation is performed on data D(1) (including the first data) in the first physical programming cell and the second parity data P2(A) of a previous physical programming cell in the current storage group to obtain the second parity data P2(A+B) of the first physical programming cell.

Next, the memory control circuit 23 may store the second parity data P2(A) and P2(A+B) based on the second programming mode. In detail, the second programming mode is a single level cell (SLC) programming mode. That is, the memory control circuit 23 may store the second parity data P2(A) and P2(A+B) in a SLC physical erasing cell with higher reliability to protect the second parity data P2(A) and P2(A+B) and increase the error correction capability.

Figure 6:
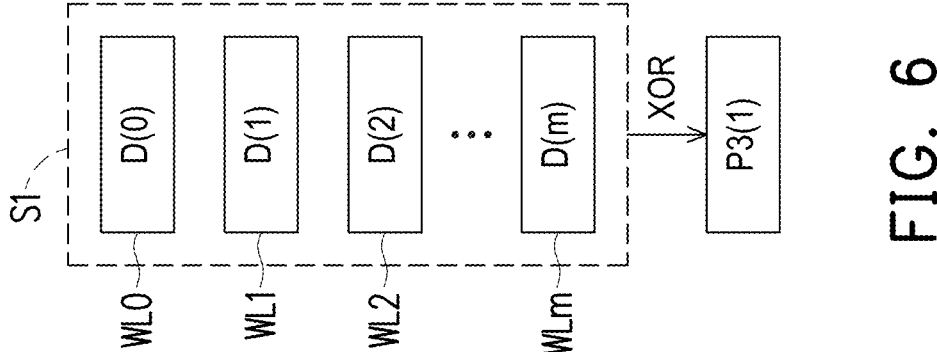
FIG. 6 is a schematic view of the third encoding process according to one embodiment of the disclosure.

On the other hand, in response to the current storage group (e.g., storage group S1) being a second storage group (i.e., a normal string), the memory control circuit 23 may further determine whether the first data has a high priority. In response to the first data not having the high priority, the memory control circuit 23 may control the encoding/decoding circuit 24 to perform a third encoding process on the current storage group to obtain third parity data. As, shown in FIG. 6, FIG. 6 is a schematic view of the third encoding process according to one embodiment of the disclosure. Below refers to FIG. 1 to FIG. 6. Specifically, the third encoding process is a general redundant array of independent disks (RAID) encoding process. The memory control circuit 23 may perform an exclusive OR (XOR) operation on multiple data D(0) to D(m) in multiple physical programming cells in the current storage group S1 to obtain third parity data P3(1). Next, the memory control circuit 23 may store the third parity data P3(1) based on the first programming mode. As mentioned above, the first programming mode is a multi level cell (MLC) programming mode or the triple level cell (TLC) programming mode.

On the contrary, in response to the first data having the high priority, the memory control circuit 23 may temporarily divide the current storage group S1 into the first storage group (i.e., weak string), control the encoding/decoding circuit 24 to perform the second encoding process, as shown in FIG. 5, to obtain the second parity data of the first physical programming cell, and store the second parity data of the first physical programming cell based on the second programming mode. That is, in the case where the first data is important data with high priority, the memory control circuit

23 may perform a second encoding process with higher reliability to enhance the protection capability of the first data.

In one embodiment, the memory control circuit 23 may receive a read command from the host system 11. Next, the memory control circuit 23 may read target data and first parity data of the target data according to the read command. Specifically, the first parity data is the error correcting code (ECC). The memory control circuit 23 may control the encoding/decoding circuit 24 to perform a first decoding process (i.e., an error correction (ECC) decoding process) on the target data according to the first parity data of the target data to verify whether the target data has errors and correct the errors in the target data.

Next, the memory control circuit 23 may determine whether the first decoding process is successful. In the case where the first decoding process is successful (i.e., the target data is correct), the memory control circuit 23 may transmit the target data to the host system 11. On the contrary, in the case where the first decoding process fails (i.e., the target data is incorrect), the memory control circuit 23 may further determine whether the target data is stored in the first storage group (i.e., a weak string).

For example, referring to FIG. 5, in response to the target data being stored in the first storage group S0, the memory control circuit 23 may obtain the second parity data P(A+B) of the target physical programming cell to which the target data (e.g., D(1)) belongs and the second parity data P(A) of the previous physical programming cell of the target physical programming cell, perform a second decoding process based on the second parity data P(A+B) of the target physical programming cell and the second parity data P(A) of the previous physical programming cell, and perform an exclusive OR (XOR) operation on the second parity data P(A+B) and the second parity data P(A) to restore the target data. Accordingly, the memory control circuit 23 may perform the first decoding process on the restored target data, and in response to the first decoding process being successful, the restored target data is transmitted to the host system 11.

On the other hand, referring to FIG. 6, in response to the target data not being stored in the first storage group, the memory control circuit 23 may obtain third parity data P3(1) of the current second storage group S1 to which the target data (e.g., data D(0)) belongs and the remaining data D(1) to D(m) stored in the current second storage group S1 and performed a third decoding process based on the third parity data P3(1) and the remaining data D(1) to D(m) to restore the target data. In one embodiment, the third decoding process is a redundant array of independent disks (RAID) decoding process. Accordingly, the memory control circuit 23 may perform the first decoding process on the restored target data, and in response to the first decoding process being successful, the restored target data is transmitted to the host system 11.

FIG. 7 is a flow chart of the memory control method according to one embodiment of the disclosure. Below refers to FIG. 7. In step S701, each of the storage groups is divided into a first storage group or a second storage group. In step S702, a first write command is received from a host system, in which the first write command includes first data and a first address. In step S703, a first encoding process is performed on the first data to obtain first parity data. In step S704, the first data and the first parity data are stored in a first physical programming cell indicated by the first address based on a first programming mode. In step S705, it is determined whether a current storage group to which the first physical programming cell belongs is the first storage group or the second storage group. In step S706, in response to the current storage group being the first storage group, a second encoding process is performed on the first physical programming cell to obtain second parity data of the first physical programming cell, and the second parity data of the first physical programming cell is stored based on a second programming mode.

However, each step in FIG. 7 has been described in detail above and is not repeated herein. It is worth noting that each step in FIG. 7 may be implemented as multiple program codes or circuits, and the disclosure is not limited thereto. In addition, the method of FIG. 7 may be used in conjunction with the above embodiments or may be used alone, and the disclosure is not limited thereto.

In summary, the memory control method and the memory storage device may provide a weak string (first storage group) improved redundant array of independent disks (RAID) operation (i.e., second encoding process), and store the second parity data in the SLC physical erasing cell to enhance the protection capability of user data and second parity data, and increase the error correction capability. In addition, the memory control method and the memory storage device of the disclosure may also perform a second encoding process with higher reliability on high-priority important data to enhance the protection capability of important data.

Finally, it should be noted that the above embodiments are only used to illustrate the technical solutions of the disclosure and are not intended to limit it. Although the disclosure has been described in detail with reference to the above embodiments, persons of ordinary skill in the art should understand that they may still modify the technical solutions described in the above embodiments, or replace some or all of the technical features therein with equivalents, and that such modifications or replacements of corresponding technical solutions do not substantially deviate from the scope of the technical solutions of the embodiments of the disclosure.

What is claimed is:

1. A memory control method, used in a memory module, the memory module comprising a plurality of storage groups, each of the plurality of storage groups comprising a plurality of wordlines, each of the plurality of wordlines comprising at least one physical programming cell, and the memory control method comprising:

dividing each of the storage groups into a first storage group or a second storage group according to an average bit error ratio of a plurality of physical programming cells in each of the storage groups, wherein in response to the average bit error ratio being greater than a default threshold value, dividing a storage group corresponding to the average bit error ratio into a first storage group, in response to the average bit error ratio being equal to or less than the default threshold value, dividing a storage group corresponding to the average bit error ratio into a second storage group;

receiving a first write command from a host system, wherein the first write command comprises first data and a first address;

performing a first encoding process on the first data to obtain first parity data, wherein the first encoding process is an error correcting encoding process;

storing the first data and the first parity data in a first physical programming cell indicated by the first address based on a first programming mode, wherein the first programming mode is a multi level cell programming mode or a triple level cell programming mode;

determining whether a current storage group to which the first physical programming cell belongs is the first storage group or the second storage group; and in response to the current storage group being the first storage group, performing a second encoding process on the first physical programming cell, performing an exclusive or operation on data in the first physical programming cell and second parity data of a previous physical programming cell in the current storage group to obtain second parity data of the first physical programming cell, and storing the second parity data of the first physical programming cell based on a second programming mode, wherein the second programming mode is a single level cell programming mode.

2. The memory control method according to claim 1, wherein in response to the current storage group being the second storage group, whether the first data has a high priority is determined, wherein in response to the first data having the high priority, the current storage group is temporarily treated as the first storage group, the second encoding process is performed on the first physical programming cell to obtain the second parity data of the first physical programming cell, and the second parity data of the first physical programming cell is stored based on the second programming mode.

3. The memory control method according to claim 2, wherein in response to the first data not having the high priority, a third encoding process is performed on the current storage group to obtain third parity data of the current storage group, and the third parity data of the current storage group is stored based on a first programming mode.

4. The memory control method according to claim 1, wherein the first parity data is an error correcting code.

5. The memory control method according to claim 1, wherein the second encoding process comprises:

in response to the first physical programming cell belonging to a first wordline of the current storage group, performing an exclusive or operation on data in the first physical programming cell to obtain the second parity data of the first physical programming cell.

6. The memory control method according to claim 3, wherein the third encoding process is a redundant array of independent disks encoding process, wherein performing the third encoding process to obtain the third parity data comprises:

performing an exclusive or operation according to a plurality of physical programming cells in the current storage group to obtain the third parity data of the current storage group.

7. The memory control method according to claim 1, further comprising:

receiving a read command from the host system;

reading target data and first parity data of the target data according to the read command;

performing a first decoding process on the target data according to the first parity data of the target data, wherein the first decoding process is an error correcting decoding process;

determining whether the first decoding process is successful;

in response to the first decoding process failing, determining whether the target data is stored in the first storage group; and in response to the target data being stored in the first storage group, obtaining second parity data of a target physical programming cell to which the target data belongs and second parity data of a previous physical programming cell of the target physical programming cell in the current storage group, and performing a second decoding process according to the second parity data of the target physical programming cell and the second parity data of the previous physical programming cell.

8. The memory control method according to claim 7, further comprising:

in response to the target data not being stored in the first storage group, obtaining third parity data of a current second storage group to which the target data belongs and remaining data stored in the current second storage group, and performing a third decoding process according to the third parity data and the remaining data, wherein the third decoding process is a redundant array of independent disks decoding process.

9. The memory control method according to claim 7, further comprising:

in response to the first decoding process being successful, transmitting the target data to the host system.

10. A memory storage device, comprising:

a connection interface, configured to connect to a host system;

a memory module, comprising a plurality of storage groups, each of the plurality of storage groups comprising a plurality of wordlines, each of the plurality of wordlines comprising at least one physical programming cell; and a memory controller, connecting the connection interface and the memory module, wherein the memory controller is configured to divide each of the storage groups into a first storage group or a second storage group according to an average bit error ratio of a plurality of physical programming cells in each of the storage groups, wherein in response to the average bit error ratio being greater than a default threshold value, divide a storage group corresponding to the average bit error ratio into a first storage group, in response to the average bit error ratio being equal to or less than the default threshold value, divide a storage group corresponding to the average bit error ratio into a second storage group, the memory controller is further configured to receive a first write command from the host system, wherein the first write command comprises first data and a first address, the memory controller is further configured to perform a first encoding process on the first data to obtain first parity data, wherein the first encoding process is an error correcting encoding process, the memory controller is further configured to store the first data and the first parity data in a first physical programming cell indicated by the first address based on a first programming mode, wherein the first programming mode is a multi level cell programming mode or a triple level cell programming mode, the memory controller is further configured to determine whether a current storage group to which the first physical programming cell belongs is the first storage group or the second storage group, and in response to the current storage group being the first storage group, the memory controller is further configured to perform a second encoding process on the first physical programming cell, perform an exclusive or operation on data in the first physical programming cell and second parity data of a previous physical programming cell in the current storage group to obtain second parity data of the first physical programming cell, and store the second parity data of the first physical programming cell based on a second programming mode, wherein the second programming mode is a single level cell programming mode.

11. The memory storage device according to claim 10, wherein in response to the current storage group being the second storage group, the memory controller is further configured to determine whether the first data has a high priority, and in response to the first data having the high priority, the memory controller is further configured to temporarily treat the current storage group as the first storage group, perform the second encoding process on the first physical programming cell to obtain the second parity data of the first physical programming cell, and store the second parity data of the first physical programming cell based on the second programming mode.

12. The memory storage device according to claim 11, wherein in response to the first data not having the high priority, the memory controller is further configured to perform a third encoding process on the current storage group to obtain third parity data of the current storage group, and store the third parity data of the current storage group based on a first programming mode.

13. The memory storage device according to claim 10, wherein the first parity data is an error correcting code.

14. The memory storage device according to claim 10, wherein in response to the first physical programming cell belonging to a first wordline of the current storage group, the memory controller is further configured to perform an exclusive or operation on data in the first physical programming cell to obtain the second parity data of the first physical programming cell.

15. The memory storage device according to claim 12, wherein the third encoding process is a redundant array of independent disks encoding process, and the memory controller is further configured to perform an exclusive or operation according to a plurality of physical programming cells in the current storage group to obtain the third parity data of the current storage group.

16. The memory storage device according to claim 10, wherein the memory controller is further configured to receive a read command from the host system, the memory controller is further configured to read target data and first parity data of the target data according to the read command, the memory controller is further configured to perform a first decoding process on the target data according to the first parity data of the target data, wherein the first decoding process is an error correcting decoding process, the memory controller is further configured to determine whether the first decoding process is successful, in response to the first decoding process failing, the memory controller is further configured to determine whether the target data is stored in the first storage group, and in response to the target data being stored in the first storage group, the memory controller is further configured to obtain second parity data of a target physical programming cell to which the target data belongs and second parity data of a previous physical programming cell of the target physical programming cell in the current storage group, and perform a second decoding process according to the second parity data of the target physical programming cell and the second parity data of the previous physical programming cell.

17. The memory storage device according to claim 16, wherein in response to the target data not being stored in the first storage group, the memory controller is further configured to obtain third parity data of a current second storage group to which the target data belongs and remaining data stored in the current second storage group, and perform a third decoding process according to the third parity data and the remaining data, wherein the third decoding process is a redundant array of independent disks decoding process.

18. The memory storage device according to claim 16, wherein in response to the first decoding process being successful, the memory controller is further configured to transmit the target data to the host system.

\* \* \* \* \*